(12) United States Patent
Gopalakrishnan

(10) Patent No.: US 7,546,378 B2
(45) Date of Patent: *Jun. 9, 2009

(54) SERVER-SIDE STREAM SWITCHING

(75) Inventor: Palamalai Gopalakrishnan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

This patent is subject to a terminal disclaimer.

(21) Appl. No.: 10/652,354

(22) Filed: Aug. 22, 2003

(65) Prior Publication Data

US 2004/0039838 A1    Feb. 26, 2004

Related U.S. Application Data

(63) Continuation of application No. 09/153,977, filed on Sep. 16, 1998, now Pat. No. 6,704,790.

(51) Int. Cl.
*G06F 15/167* (2006.01)
*G06F 15/16* (2006.01)
*H04N 7/10* (2006.01)
*H04J 3/24* (2006.01)
*H04J 1/00* (2006.01)

(52) U.S. Cl. .............. 709/236; 709/213; 709/219; 709/231; 725/34; 725/35; 725/36; 370/474; 370/486

(58) Field of Classification Search .............. 709/231, 709/236, 245, 238, 213, 219; 725/34–36, 725/144; 370/474, 486
See application file for complete search history.

(56) References Cited

U.S. PATENT DOCUMENTS

| | | | |
|---|---|---|---|
| 5,761,601 A | * | 6/1998 | Nemirofsky et al. .......... 725/34 |
| 5,838,927 A | | 11/1998 | Gillon et al. |
| 5,859,660 A | | 1/1999 | Perkins et al. |
| 5,905,872 A | * | 5/1999 | DeSimone et al. .......... 709/245 |
| 5,917,830 A | * | 6/1999 | Chen et al. .................. 370/487 |
| 5,928,331 A | | 7/1999 | Bushmitch |
| 5,953,506 A | * | 9/1999 | Kalra et al. ................. 709/231 |
| 6,006,264 A | | 12/1999 | Colby et al. |
| 6,041,345 A | * | 3/2000 | Levi et al. ................... 709/217 |
| 6,070,184 A | * | 5/2000 | Blount et al. ............... 709/200 |
| 6,122,743 A | | 9/2000 | Shaffer et al. |
| 6,144,375 A | | 11/2000 | Jain et al. |
| 6,182,146 B1 | | 1/2001 | Graham-Cumming, Jr. |
| 6,208,640 B1 | | 3/2001 | Spell et al. |
| 6,266,701 B1 | * | 7/2001 | Sridhar et al. .............. 709/232 |

(Continued)

OTHER PUBLICATIONS

Hoffman et al., RFC 2038 (Request for Comments), "RTP Payload Format for MPEG1/MPEG2 Video," Oct. 1996, pp. 1-11.

(Continued)

*Primary Examiner*—William C Vaughn, Jr.
*Assistant Examiner*—Umar Cheema
(74) *Attorney, Agent, or Firm*—Lee & Hayes, PLLC

(57) ABSTRACT

Server-side stream switching is disclosed. In one embodiment, a system includes a server and a client. The server is capable of sending data within a first and a second stream via packets with a predetermined data designator, and of indicating switching from the first to the second stream via a packet with a predetermined switching designator. The client is capable of receiving the packets containing the data within the first and the second streams, and the packet with the predetermined switching designator. HyperText Transport Protocol (HTTP) server-side stream switching is particularly disclosed.

17 Claims, 4 Drawing Sheets

U.S. PATENT DOCUMENTS

| | | |
|---|---|---|
| 6,269,403 B1 | 7/2001 | Anders |
| 6,343,328 B1 | 1/2002 | Murphy, Jr. et al. |
| 6,370,581 B2 * | 4/2002 | Rader .......................... 709/230 |
| 6,457,054 B1 * | 9/2002 | Bakshi ....................... 709/227 |
| 6,459,427 B1 | 10/2002 | Mao et al. |
| 6,487,721 B1 | 11/2002 | Safadi |
| 6,704,790 B1 * | 3/2004 | Gopalakrishnan ........... 709/231 |
| 6,789,119 B1 * | 9/2004 | Zhu et al. ................... 709/227 |
| 2003/0236902 A1 * | 12/2003 | Weiss et al. ................. 709/231 |

OTHER PUBLICATIONS

Hoffman et al., RFC 2250 (Request for Comments), "RTP Payload Format for MPEG1/MPEG2 Video," Jan. 1998, pp. 1-16.

* cited by examiner

SERVER-SIDE STREAM SWITCHING

RELATED APPLICATIONS

This application is a continuation of U.S. patent application Ser. No. 09/153,977, filed Sep. 16, 1998 now U.S. Pat. No. 6,704,790.

FIELD

This invention relates generally to data streams, and more particularly to server-side switching of such streams.

BACKGROUND

The Internet has become an increasingly popular manner by which to convey information such as multimedia clips. There are generally at least two ways for a user to download such clips from a remote server to be played on his or her (client) computer. First, the user can initiate a download, such that when a clip has finished being downloaded, it can be played on the computer. However, this is disadvantageous, because many clips are relatively large in file size, which means that the user may have to wait a long time before he or she can play a given clip.

A second way is known as streaming. With streaming technology, the user's computer requests that the server begin sending a stream of data thereto. As the stream of data is being received, it is immediately played on the user's computer, with a predetermined buffer allowance so that if there is a delay in transmission, playing of the multimedia clip is not interrupted. Streaming is advantageous over completely downloading a clip before beginning playback, because the user is able to play the clip immediately as it is being received, without the delay in waiting for the downloading of the clip to be completed.

However, a disadvantage with streaming as per its most common transmission mechanism, known as HyperText Transport Protocol, or HTTP, is that the server is usually able only to respond to a relatively simple "get stream" request sent by a client computer. Thus, a user's computer issues a "get stream" request to the server, and in response, the server sends the desired stream to the user's computer. This is disadvantageous because the server is able only to send the requested stream, and after the requested stream has finished being transmitted, must usually wait for another "get stream" request before sending another stream to the user's computer.

For example, a user may desire to have an episode of a television program transmitted via streaming. Such an episode, however, may have multiple streams: a first stream of the introduction of the program, followed by one or more streams related to advertisements, followed by a stream of a first part of the program, followed by more streams related to advertisements, etc. In such a situation, the server is generally not able to indicate to the client computer that a given stream is to end and a new stream is to begin. That is, the server is generally not able to switch streams while streaming multimedia clips to a client computer.

For these and other reasons, there is a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment of the invention, a system includes a server and a client. The server is capable of sending data within a first stream and a second stream via packets. The packets begin with a predetermined data designator. The server is also capable of indicating switching from the first to the second stream via a packet with a predetermined switching designator. The client is capable of receiving the packets containing the data within the first and the second streams, as well as the packet with the predetermined switching designator.

Thus, the invention provides for advantages not found in the prior art. In one particular embodiment, desirably the packets are formatted according to the HyperText Transport Protocol (HTTP), and the server and the client are communicatively coupled via the Internet. In response to a "get stream" request from a client, a server is able to send packets of data relating to the desired stream, and is able to indicate to the client that it is switching from transmitting that stream of data to another stream of data, via a packet with a predetermined switching designator. Thus, in an example where a server desires to switch from a stream relating to a television program to a stream relating to an advertisement, it is able to do so.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system of one embodiment of the invention is presented. In the third section, a method, in accordance with an embodiment of the invention, is provided. In the fourth section, data structures according to an embodiment of the invention are described. Finally, in the fifth section, a conclusion of the detailed description is provided.

Hardware and Operating Environment

Figure 1:
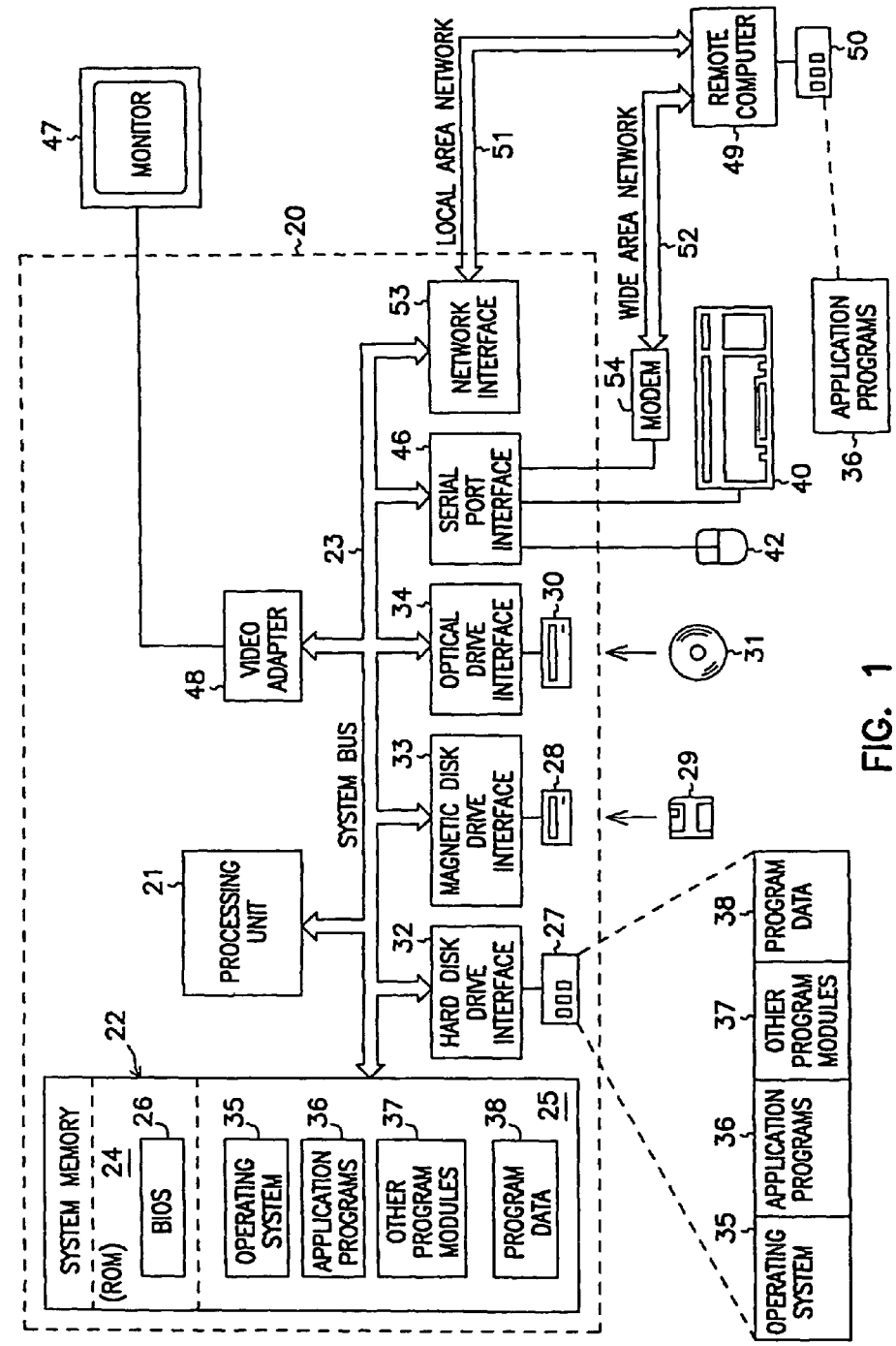
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

In this section of the detailed description, a description of a computerized system according to an embodiment of the invention is provided. The description is provided by reference to FIG. 2. The description is specifically made with reference to server-side stream switching in the context of the HyperText Transport Protocol (HTTP), desirably as to communication between the server and a client over the Internet. However, the invention is not so limited; the invention pertains to server-side stream switching in contexts other than HTTP, and also where the server and the client communicate in manners besides over the Internet.

Figure 2:
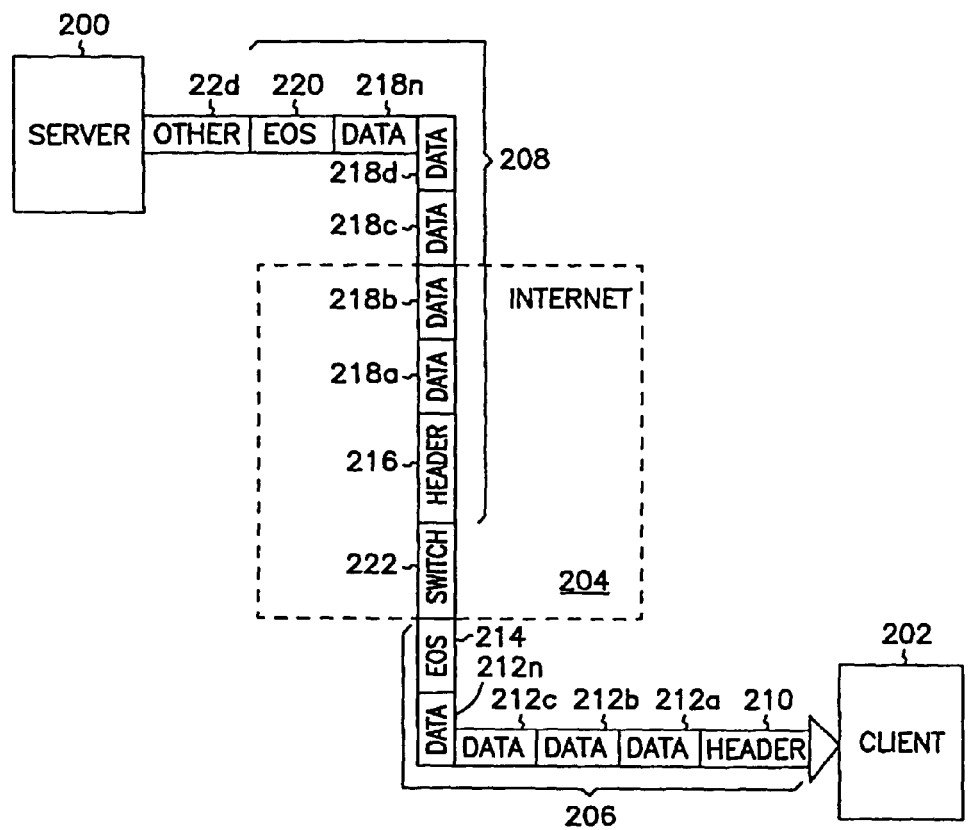
FIG. 2 shows a block diagram of a system according to one embodiment of the invention.

Referring now to FIG. 2, a system according to an embodiment of the invention is shown. The system includes a server 200, a client 202, and the Internet 204. The server 200 is communicatively coupled to the client 202 via the Internet 204. As shown in FIG. 2, there is only one client 202, for sake of illustrative clarity. However, those of ordinary skill within the art can appreciate that the server 200 may communicate with a plurality of clients such as the client 202.

The server 200 is transmitting to the client 202 two streams of data, a first data stream 206, and a second data stream 208. Each of these streams of data may relate to any type of data. In one embodiment, such data relates to multimedia clips. For example, the first data stream 206 may relate to the introduction of a television program, and the second data stream 208 may relate to an advertisement for playback after the introduction of the television program. The streams of data are transmitted such that as they are received at client 202, they are played back thereat. Those of ordinary skill within the art can appreciate that while only two streams of data are depicted in FIG. 2, the invention is not limited to the transmission of only two data streams, and that any number of data streams may be transmitted in accordance with embodiments of the invention.

Each stream of data is delivered from the server 200 to the client 202 as a number of packets. For example, the data stream 206 is transmitted as a header packet 210, to identify the data stream 206, a number of data packets 212a, 212b, 212c, ..., 212n, actually containing the data of the stream, and an end-of-stream packet 214, to indicate the end of the data stream 206. The data stream 208 is transmitted as a header packet 216, a number of data packets 218a, 218b, 218c, 218d, ..., 218n, and an end-of-stream packet 220. The packetizing of the data streams 206 and 208 allow for the server 200 to send the streams over the Internet 204, such that they are received by the client 202 and reassembled into their respective streams. In one embodiment of the invention, the packets are formatted according to the HyperText Transport Protocol (HTTP), as known within the art.

The header packets, such as packet 210 of stream 206 and packet 216 of stream 208, include a predetermined header designator as sent by the server 200 to indicate to the client 202 receiving the packets that a given stream is beginning and to which stream they relate. The data packets, such as packets 212a, 212b, 212c, ..., 212n of stream 206 and packets 218a, 218b, 218c, 218d, ..., 218n of stream 208 include a predetermined data designator as sent by the server 200 to indicate to the client 202 receiving the packets that they are data and to which stream they relate. The end-of-stream packets, such as packet 214 of stream 206 and packet 220 of stream 208 include a predetermined end-of-stream data designator as sent by the server to indicate to the client 202 receiving the packets that a given stream is ending and to which stream they relate.

The server 200 also sends a switching packet 222 to indicate to the client 202 receiving the packet 222 that the server 200 is switching from a first data stream to a second data stream, namely, from stream 206 to stream 208. The switching packet 222 includes a predetermined switching designator to indicate that data streams are being switched. The switching packet is what provides embodiments of the invention the capability of server-side stream switching. The packet is sent by the server, and received by the client. Finally, those of ordinary skill within the art can appreciate that other types of packets may also be sent by the server 200 to the client 202, such as the packet 224. The packet 224 may be, for example, an HTTP message, distinguished from what is known as ASF (audio/video, or, multimedia, clip data) packets; the invention is not so limited, however.

Thus, as has been described in conjunction with FIG. 2, embodiments of the invention provide for server-side stream switching. This enables a server to indicate to a client that a first stream is going to be switched to a second stream. Such capability is typically not available in HTTP stream switching. Thus, embodiments of the invention allow for a clip of a first segment of a television program to be immediately followed by a clip of an advertisement, for example. Those of ordinary skill within the art can appreciate that other applications and advantages of the invention also exist.

Method

In this section of the detailed description, a method according to an embodiment of the invention is presented. This description is provided in reference to FIG. 3. The description is specifically made with reference to server-side stream switching in the context of the HyperText Transport Protocol (HTTP), desirably as to communication between the server and a client over the Internet. However, the invention is not so limited; the invention pertains to server-side stream switching in contexts other than HTTP, and also where the server and the client communicate in manners besides over the Internet.

The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a program is executed by a processor of a server computer from a medium therefrom to send streams of data via packets having predetermined data designators, and to send one or more packets to switch between successive streams having a predetermined switching designator. In another embodiment, a program is executed by a processor of a client computer from a medium therefrom to receive these streams of data via packets of data having predetermined data designators, and to receive one or more packets to switch between successive streams having a predetermined switching designator.

Figure 3:
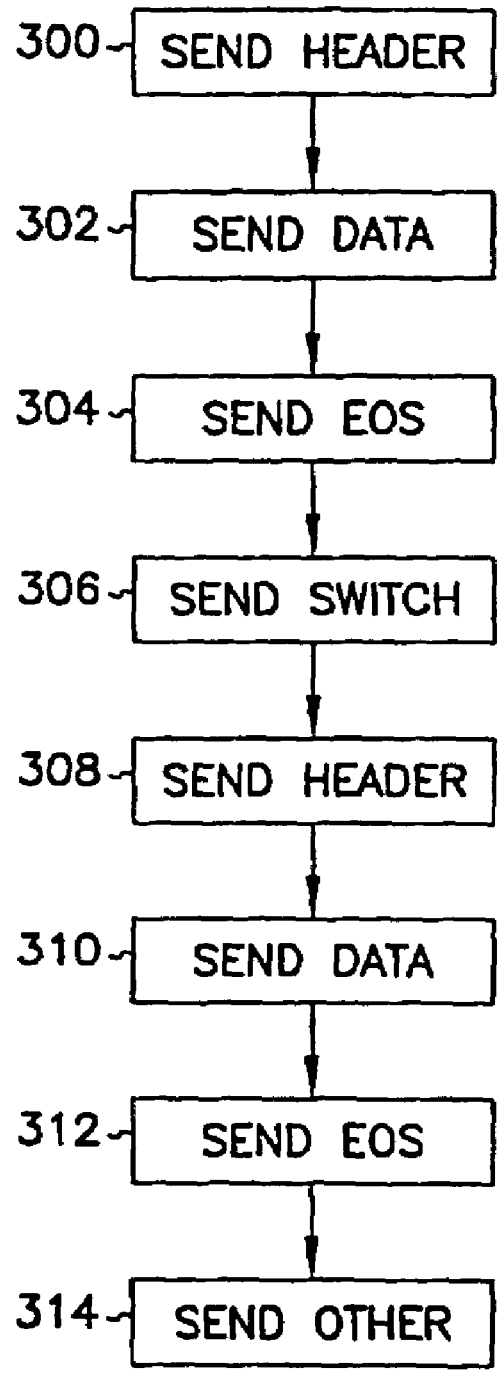
FIG. 3 shows a flowchart illustrating a method according to one embodiment of the invention; and, FIGS. 4(a)-4(d) show diagrams of data structures according to one embodiment of the invention.
Figure 4A:
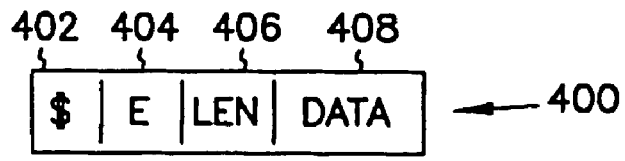
Figure 4B:
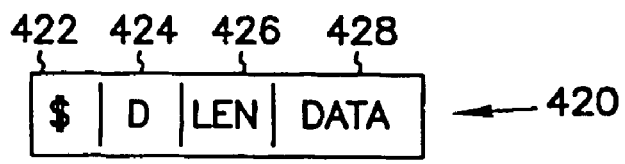
Figure 4C:
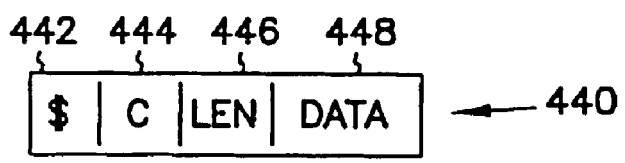
Figure 4D:
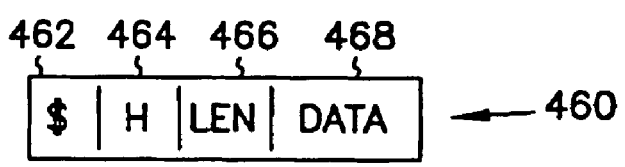

Referring now to FIG. 3, a flowchart of a method according to one embodiment of the invention is shown. In 300, a server sends a packet with a predetermined header designator for a first data stream. This packet may be sent over the Internet via HTTP, and is received by a client that may have requested the first data stream. The data stream desirably relates to a multimedia clip, such as an audio or video clip, for playback on the client. In 302, the server sends at least one packet of the data of the first stream. Each data packet begins with a predetermined data designator. The packets may be sent over the Internet, again via HTTP, and is received by the client, which reassembles the packets into the first data stream, and plays the data stream as it receives the data, with an optional allowance for a buffer of a predetermined size so that any delays in packet transmission do not result in interruption of stream playback. In 304, the server sends a packet with a predetermined end-of-stream designator for the first data stream, to indicate to the client that the first data stream is complete. This packet also may be sent over the Internet via HTTP, and is received by the client.

In 306, the server sends a packet with a predetermined switching designator. The server sends this packet to switch from the first stream of data to a second stream of data. Like the first stream of data, the second data stream also desirably relates to a multimedia clip, such as an audio or video clip, for playback on the client. This packet may be sent over the Internet via HTTP, and is received by the client that may have initially requested the first data stream. Thus, via this packet, embodiments of the invention provide for switching from a first data stream to a second data stream (as well as additional data streams, as those of ordinary skill within the art can appreciate).

In 308, the server sends a packet with a predetermined header designator for the second data stream. This packet may be sent over the Internet via HTTP, and is received by the client. In 310, the server sends at least one packet of the data of the second stream. Each data packet begins with a predetermined data designator. The packets may be sent over the Internet, again via HTTP, and is received by the client, which reassembles the packets into the second data stream, and plays the data stream as it receives the data, with an optional allowance for a buffer of a predetermined size so that any delays in packet transmission do not result in interruption of stream playback. In 312, the server sends a packet with a predetermined end-of-stream designator for the second data stream, to indicate to the client that the second data stream is complete. This packet also may be sent over the Internet via HTTP, and is received by the client.

Those of ordinary skill within the art can appreciate that packets of other types may also be sent. Thus, in 314, for sake of example, the server sends to the client another packet, unrelated to the first and the second data streams. This packet may be, for example, an HTTP message, such that the packet includes a predetermined HTTP message designator, and as such a message is distinguished from what is known as ASF packets.

A method according to an embodiment of the invention has been described. The invention according to this embodiment provides for the playback of more than one stream of data on a client computer as sent by a server computer, such that the server computer is able to switch from a first data stream to a second data stream without receiving a request to do so from the client computer. In contexts such as HTTP, this allows for server-side stream switching, and more advantageous data streaming as compared to the prior art.

Data Structures

In this section of the detailed description, data structures according to an embodiment of the invention is presented. This description is provided in reference to FIGS. 4(*a*)-4(*d*). The description is specifically made with reference to server-side stream switching in the context of the HyperText Transport Protocol (HTTP), desirably as to communication between the server and a client over the Internet. However, the invention is not so limited; the invention pertains to server-side stream switching in contexts other than HTTP, and also where the server and the client communicate in manners besides over the Internet. The data structures are desirably stored on a computer-readable medium, such as a memory of a computer, a floppy disk, or a CD-ROM.

In the context of HTTP, clients expect ASF (audio/video clip, or multimedia clip) data to be in packet format. That is, the audio/video clip is broken into packets and sent by a server, and are merged at the client and rendered. HTTP uses printable ASCII character to construct messages of the protocol. The data structures according to the embodiment of the invention described in this section of the detailed description differentiate between a "pure" HTTP message and ASF data. In particular, the "$" character is used to signify the beginning of a message that is not an HTTP message. A typical HTTP message is "GET/index.htm HTTP/1.0". ASF-related messages, that are specific to data stream, like end-of-stream message, stream-switch message, data packet, and ASF header packet thus all begin with a "$" character in this embodiment of the invention, followed by the type of the message, also denoted by a character, and then the length of the message followed by the packet of information itself.

The designation of ASF-related packet as differentiated from HTTP message packets allows for the sending of both ASF message and data packets from a server to a client without violating the protocol. This assists in passing such ASF message and data packets by security proxies, as known within the art, which may otherwise stop the packets if a command were detected (e.g., if an HTTP message packet were detected). This is advantageous as compared to prior art data streaming, and importantly provides for server-side stream switching without catching the attention of security proxies, etc., that may separate clients from the Internet.

Referring now to FIG. 4(*a*), a diagram of a data structure for processing a packet for data streams is shown. This diagram specifically relates to end-of-stream messages, and is desirably stored on a computer-readable medium such as a memory or a storage device such as a floppy disk. The structure 400 includes fields 402, 404, 406 and 408. Field 402 stores data indicating that the packet is a non-HTTP message, such as the character "$". Field 404 stores data representing a predetermined end-of-stream designator for a stream of data, such as the character "E", to indicate that the packet is an end-of-stream packet. Field 406 stores data indicating the length of the data (information) stored in the packet itself. This data (information) is stored in field 408; thus, field 408 stores data representing information regarding the packet itself.

Referring next to FIG. 4(*b*), a diagram of another data structure for processing a packet for data streams is shown. This diagram specifically relates to data packets, and is desirably stored on a computer-readable medium such as a memory or a storage device such as a floppy disk. The structure 420 includes fields 422, 424, 426 and 428. Field 422 stores data indicating that the packet is a non-HTTP message, such as the character ☐$☐. Field 424 stores data representing a predetermined data designator for a stream of data, such as the character "D", to indicate that the packet includes data for a stream. Field 426 stores data indicating the length of the data (information) stored in the packet itself. This data (information) is stored in field 428; thus, field 428 stores data representing the information of a data stream.

Referring next to FIG. 4(*c*), a diagram of another data structure for processing a packet for data streams is shown. This diagram specifically relates to stream-switching messages, and is desirably stored on a computer-readable medium such as a memory or a storage device. The structure 440 includes fields 442, 444, 446 and 448. Field 442 stores data indicating that the packet is a non-HTTP message, such as the character □$□. Field 444 stores data representing a predetermined switching designator, such as the character □C□, to indicate that switching is to occur from a first stream of data to a second stream of data. Field 446 stores data indicating the length of the data (information) stored in the packet itself. This data (information) is stored in field 448; thus, field 448 stores data representing information regarding the packet itself.

Referring finally to FIG. 4(*d*), a diagram of another data structure for processing a packet for data streams is shown. This diagram specifically relates to header messages (packets), and is desirably also stored on a computer-readable medium such as a memory or a storage device. The structure 460 includes fields 462, 464, 466 and 468. Field 462 stores data indicating that the packet is a non-HTTP message, such as the character □$□. Field 464 stores data representing a predetermined header designator for a stream of data, such as the character "H", to indicate that the packet is a header packet. Field 466 stores data indicating the length of the data (information) stored in the packet itself. This data (information) is stored in field 468; thus, field 468 stores data representing information regarding the packet itself.

Those of ordinary skill within the art can appreciate that the data structures shown and described in this section of the detailed description are not limiting of the invention. That is, different embodiments of the invention may use data structures other than those described here. The data structures described herein are in particular utilizable in the context of HTTP, although other data structures according to the invention may be utilizable in the context of HTTP as well.

CONCLUSION

Server-side stream switching has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A Computer-readable medium comprising processor-executable instructions for performing a computer method, the method comprising:
   receiving an HTTP request for an HTTP response, wherein the HTTP request includes a get stream request; and
   sending the HTTP response over a network via HTTP, wherein the HTTP response comprises (i) HTTP data in HTTP packets configured using ASCII characters and (ii) streaming data configured as advanced streaming format (ASF) data in ASF packets, wherein the ASF data conforms to a data structure, wherein the data structure comprises:
      a header object which contains information about the ASF data,
      an index object that supports random access to data within data structure, and
      a data object which includes at least a first data stream and a second data stream;
   wherein the ASF packets include at least one ASF header packet, at least one ASF data packet, and at least one ASF end-of-stream packet;
   wherein each ASF packet begins with a predetermined data designator;
   wherein a character forms a demarcation between the streaming data and the HTTP data;
   wherein the ASF data comprises a predetermined switching designator, and wherein the sending of the streaming data is switched from the first data stream to the second data stream after transmission of the predetermined switching designator.

2. A Computer-readable medium as recited in claim 1, wherein the character forming the demarcation is a $.

3. A Computer-readable medium as recited in claim 1, wherein the sending comprises further instructions for sending the streaming data within the HTTP response as part of an object tag to a client through a security proxy, and wherein each ASF packet of the first data stream and each packet of the second data stream begins with a predetermined data designator, and wherein a predetermined switching designator is a switching packet which comprises at least four fields where the four fields are: a message type field, a predetermined switching designator field, a length of data field which indicates the length of data in the switching packet, and a switching packet data field which includes the data delivered as part of the switching packet.

4. A Computer-readable medium comprising processor executable instructions for performing a computer method, the method comprising:
   responding to an HTTP request with an HTTP response comprising both HTTP data and streaming data, wherein the streaming data is configured as advanced streaming format (ASF) data in ASF packets, wherein the ASF data conforms to a data structure wherein a character forms a demarcation between the streaming data and the HTTP data, wherein the data structure comprises:
      a header object which contains information about the ASF data, an index object that supports random access to data within data structure, and a data object which includes at least a first data stream and a second data stream;
   wherein each ASF packet begins with a predetermined data designator;
   wherein the ASF packets include at least one ASF header packet, at least one ASF data packet, and at least one ASF end-of-stream packet;
   and wherein the ASF data comprises a predetermined switching designator, wherein the sending of the streaming data is switched from a first data stream to a second data stream after transmission of the predetermined switching designator.

5. A Computer-readable medium as recited in claim 4, wherein the method further comprises sending the streaming data within the HTTP response to a client through a security proxy.

6. A Computer-readable medium as recited in claim 4 wherein the first stream comprises content for a television program and the second stream comprises content for an advertisement.

7. A server comprising:
   means for responding to an HTTP request with an HTTP response, the HTTP response comprising HTTP data defined by ASCII characters and streaming data configured within the HTTP response following a character, wherein the streaming data comprises a first and a second data stream;

means for indicating a switch between the first data stream and the second data stream by inclusion of an indicator within the streaming data;

means for configuring the streaming data as advanced streaming format (ASF) data in ASF packets, wherein the ASF data conforms to a data structure, and wherein the data structure comprises:

a header object which contains information about the ASF data, an index object that supports random access to data within data structure, and a data object which includes at least a first data stream and a second data stream;

wherein each ASF packet begins with a predetermined data designator;

wherein the ASF packets include at least one ASF header packet, at least one ASF data packet, and at least one ASF end-of-stream packet; and means for sending the HTTP response over a network via HTTP and means for sending the HTTP response to a client behind a security proxy.

8. The server of claim 7, wherein the character, which precedes the streaming data, is a $.

9. A computer implemented method of configuring packets within an HTTP response, the method comprising:

including within the HTTP response both HTTP data and streaming data, wherein the streaming data is configured as advanced streaming format (ASF) data in ASF packets, wherein the ASF data conforms to a data structure, wherein the data structure comprises:

a header object which contains information about the ASF data, an index object that supports random access to data within data structure, and a data object which includes at least a first data stream and a second data stream;

wherein each ASF packet begins with a predetermined data designator;

wherein the ASF packets include at least one ASF header packet, at least one ASF data packet, and at least one ASF end-of-stream packet;

transmitting at least a portion of the HTTP data in ASCII format prior to a character designated for demarcation between the HTTP data and the streaming data;

transmitting the streaming data after the character designated for demarcation between the HTTP data and the streaming data;

switching from a first data stream to a second data stream following a predetermined switching designator within the streaming data; and sending the HTTP response over a network via HTTP.

10. A computer implemented method of claim 9, wherein the character designated for demarcation is a $.

11. A computer implemented method of claim 9, wherein the sending additionally comprises sending the streaming data within the HTTP response to a client through a security proxy.

12. A computer implemented method of claim 11, wherein the first data stream comprises content for a television program and the second data stream comprises content for an advertisement.

13. A computer implemented method for switching between a first data stream and a second data stream, the method comprising:

receiving an HTTP request for an HTTP response;

providing the HTTP response;

including within the HTTP response HTTP data and streaming data, wherein the streaming data is advanced streaming format (ASF) data in ASF packets, wherein each ASF packet begins with a predetermined data designator, wherein the ASF packets include at least one ASF header packet, at least one ASF data packet, and at least one ASF end-of-stream packet, wherein the ASF data conforms to a data structure, and wherein the data structure comprises:

a header object which contains information about the ASF data, an index object that supports random access to data within data structure, and a data object which includes at least a first data stream and a second data stream;

streaming data after a character designated to demark the streaming data within the HTTP response;

including a predetermined switching designator within the streaming data;

switching from a first data stream to a second data stream after transmission of the predetermined switching designator; and sending the HTTP response over a network via HTTP to a client through a security proxy.

14. A computer implemented method as recited in claim 13, additionally comprising streaming data after a character designated to demark ASF data within the HTTP response.

15. A computer implemented method as recited in claim 13, wherein the character designated to demark ASF data is a $.

16. A computer implemented method for alternating between transmission of a television program and at least one television commercial, the method comprising:

receiving an HTTP request for an HTTP response;

sending the HTTP response over a network via HTTP, wherein the HTTP response comprises (i) HTTP data in HTTP packets configured using ASCII characters and (ii) streaming data configured as advanced streaming format (ASF) data in ASF packets, wherein each ASF packet begins with a predetermined data designator, wherein the ASF packets include at least one ASF header packet, at least one ASF data packet, and at least one ASF end-of- stream packet, wherein the ASF data conforms to a data structure, and wherein the data structure comprises:

a header object which contains information about the ASF data, an index object that supports random access to data within data structure, and a data object which includes at least a first data stream and a second data stream;

sending a first data stream comprising at least portions of the television program within the HTTP response after a demarcation character;

sending a predetermined switching designator within the first data stream; and sending a second data stream within the HTTP response comprising the at least one television commercial, wherein the switching designator signals switching from the first data stream to the second data stream.

17. A computer implemented method as recited in claim 16, additionally comprising alternating between transmission of the television program and the at least one television commercial by sending the predetermined switching designator.

* * * * *